United States Patent [19]

Aiello

[11] Patent Number: 4,652,806
[45] Date of Patent: Mar. 24, 1987

[54] MICRO-STEPPING TRANSLATOR CONTROLLER

[75] Inventor: Michael E. Aiello, Monroeville, Pa.

[73] Assignee: Aerotech, Inc., Pittsburgh, Pa.

[21] Appl. No.: 821,831

[22] Filed: Jan. 23, 1986

[51] Int. Cl.$^4$ ............................................. H02P 8/00
[52] U.S. Cl. ..................................... 318/696; 318/685
[58] Field of Search ................................. 318/685, 696

[56] References Cited

U.S. PATENT DOCUMENTS

| | | | |
|---|---|---|---|
| 3,885,210 | 5/1975 | Burnett | 318/696 |
| 3,906,319 | 9/1975 | Milligan | 318/318 |
| 4,087,732 | 5/1978 | Pritchard | 318/696 |
| 4,091,316 | 5/1978 | Friedman | 318/696 |
| 4,100,471 | 7/1978 | Pritchard | 318/685 |
| 4,119,902 | 10/1978 | Newell | 318/696 |
| 4,121,145 | 10/1978 | Talmadge | 318/696 |
| 4,125,801 | 11/1978 | Leenhouts | 318/696 |
| 4,140,955 | 2/1979 | Drabing | 318/696 |
| 4,145,644 | 3/1979 | Lin | 318/696 |
| 4,151,449 | 4/1979 | Takahashi | 318/138 |
| 4,284,940 | 8/1981 | Welburn | 318/696 |
| 4,297,625 | 10/1981 | Newell | 318/696 |
| 4,306,181 | 12/1981 | Welburn | 318/696 |
| 4,443,746 | 4/1984 | Araki | 318/696 |

Primary Examiner—William M. Shoop, Jr.
Assistant Examiner—Saul M. Bergmann
Attorney, Agent, or Firm—Webb, Burden, Robinson & Webb

[57] ABSTRACT

A micro-stepping translator controller for supplying current to a stepping motor having a plurality of windings comprises a power supply for supplying current to all windings and electronic switches for gating current to all windings. Logic means receive inputs comprising a clock input having a frequency being indicative of the micro-stepping rate and a multiplexing pulse. The logic means having digital circuits for outputting over a data bus signals indicative of two quadrants of a stepped periodic function. The signals correspond to different phases of the stepped periodic function during different multiplexing intervals. The logic means has digital circuits for sequentially outputting signals indicative of one of the four quadrants. A digital-to-analog converter is connected to the output data bus for producing an analog signal. Multiplexing and inverting means select and during some multiplexing intervals invert the output of the digital-to-analog converter in response to the multiplexing pulse and a signal indicative of quadrant, to produce at least two interleaved stepped periodic signals. An output circuit including said electronic switches, in response to said at least two interleaved stepped periodic signals, gate the electronic switches on and off during one-half of the cycle of one of said stepped periodic functions.

5 Claims, 16 Drawing Figures

MICRO-STEPPING TRANSLATOR CONTROLLER

DESCRIPTION

Field of the Invention

This invention relates to stepping motor controllers and more particularly to micro-stepping motor controllers in which each full electrical cycle that moves the rotor between adjacent electrical poles may be divided into a plurality of micro-steps.

BACKGROUND OF THE INVENTION

Stepping motor controllers of the general type being described are discussed in the following U.S. Pat. Nos. 4,297,625; 4,121,145; 4,151,449; 4,119,902; 4,145,644, 4,100,471; 4,091,316; 4,125,801; 4,284,940; 4,306,181; 3,906,319; 3,885,210; and 4,087,732.

A drawback of prior micro-stepping controllers is that the stepped periodic functions for controlling the motor could not be selected, say, sinusoidal and/or were not designed for rapid change in resolution (the number of micro-steps per revolution).

Another drawback of prior micro-stepping controllers is the number of components required.

SUMMARY OF THE INVENTION

Briefly according to this invention, a micro-stepping translator controller is provided for supplying current to a stepping motor having a plurality of windings. The controller comprises a power supply for supplying current to all windings and electronic switches for gating current to each winding. The electronic switches, say, power FETs are arranged in an output section which is responsive to two stepped periodic functions generated by a wave form generating section. The periodic functions may, for example, be stepped sine and cosine functions. The wave form generating section comprises a multiplexing oscillator which outputs multiplexing pulses and a logic means which receives inputs comprising a clock input having a frequency indicative of the micro-stepping rate and the multiplexing pulses. The logic means have digital circuits for outputting, over a data bus, signals (binary values) indicative of the value of two quadrants of a stepped periodic function. The signals correspond to different phases of the stepped periodic function during different multiplexing intervals. The logic means have digital circuits for sequentially outputting signals indicative of one of the two quadrants. A digital-to-analog converter is connected to the output data bus for producing an analog signal. The analog signal is supplied to a multiplexing and inverting means. It selects and inverts the output of the digital-to-analog converter (in response to the multiplexing pulse and a signal indicative of quadrant) to produce at least two interleaved stepped periodic signals. The output circuit, which includes the electronic switches, gates each electronic switch on or off during one-half of the cycle of one of the stepped periodic functions.

Typically, a stepping motor has a plurality of windings assigned to at least two phase groups. The phase groups are arranged in pairs that are never simultaneously energized. Each phase group is controlled by a stepped periodic function generated by the wave form generator.

Current sensors are associated with each electronic switch for producing a signal indicative of the current through said switch.

Summing means are associated with each signal phase and with one pair of switches for smoothing the multiplexed stepped periodic function applied thereto and combining it with feedback signals from current sensors to produce error signals for each pair of switches. A plurality of comparators have the outputs thereof individually connected to the control terminal of one switch. The comparators have inverting and noninverting inputs. Means connect the outputs of each summing means to comparators associated with one pair of switches respectively. Means connect the output of a triangle wave generator to all comparators. Means adjust the D.C. level of the triangle wave before application to the comparators such that individual switches are gated on only during half cycles of one of said stepped periodic functions.

Preferably, the micro-stepping translator controller according to this invention further comprises gates between each comparator and each associated switch. A shutdown circuit latches if the current in any switch exceeds a threshold indicative of a short circuit and generates a shutdown signal. The shutdown signal is applied to the gates to prevent the switches from conducting.

Preferably the translator controller according to this invention further comprises means for adjusting the amplitude of the output of the analog-to-digital converter.

THE DRAWINGS

FIGS. 6(a) to 6(j) are wave form diagrams to illustrate the operation of the circuit of FIG. 5.

DESCRIPTION OF THE PREFERRED EMBODIMENTS

Figure 1:
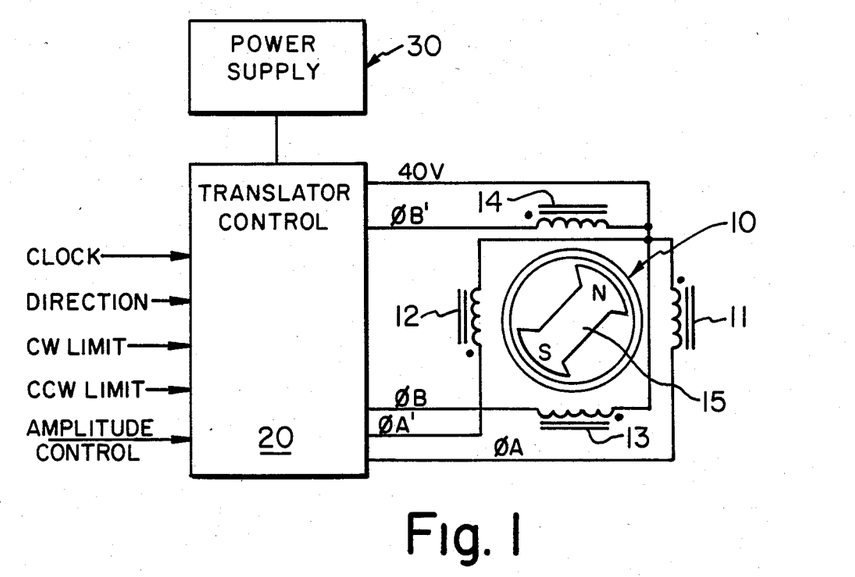
FIG. 1 is a schematic illustration of the relationship between the translator controller according to this invention, a stepping motor, a power supply and the inputs to the translator controller.

FIG. 1 illustrates in block diagram form the interconnection of a stepping motor 10, a translator control unit 20, and a power supply 30.

The stepping motor 10 is a form of synchronous motor. Its rotor 15 produces a constant flux with a direction relative to rotor angle (or position). This constant flux is produced by a permanent magnet in the rotor 15. Its stator contains multiple windings (11, 12, 13, 14) that are configured in such a way as to produce a net stator flux of given magnitude and angle, prescribed by the amplitudes of current controlled separately in each winding.

Through the laws of magnetic coupling, rotor flux (and in turn, the rotor itself) will tend to "follow" a rotating stator flux. The rotating stator flux is produced by the change in amplitudes of the current flowing in the windings of the stator. With a given magnitude of stator flux, the torque on the rotor (caused by either frictional or mechanical loading) is proportional to the angular difference between the net stator flux and net rotor flux. This angular difference is usually referred to as the torque angle.

Figure 2:
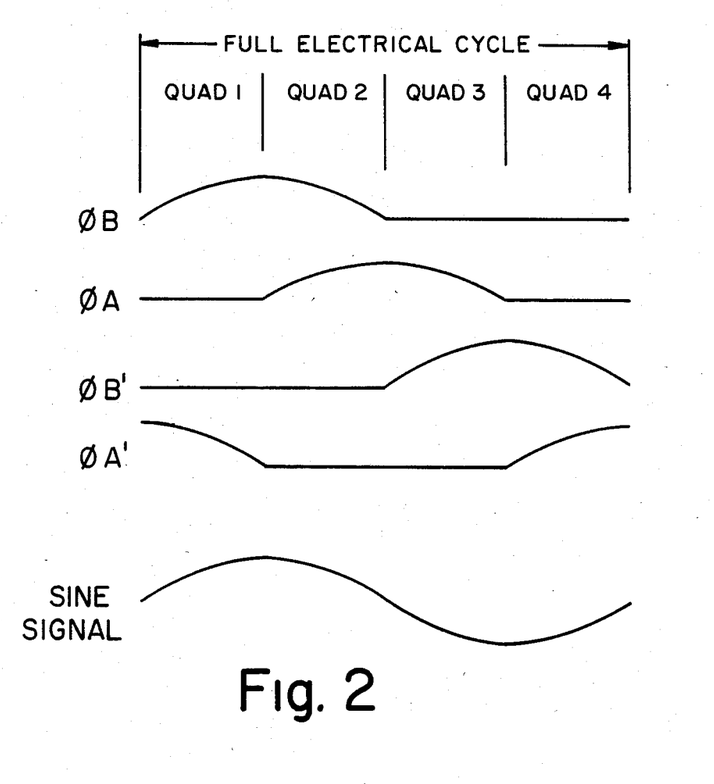
FIG. 2 illustrates the outputs of the translator controller for a full electrical cycle.

The stepping motor is basically a four phase machine. The particular stepping motor illustrated comprises windings 11, 12, 13, 14 (which may be illustrative of groups of windings). In the case of micro-stepping control, current in the windings is controlled respectively by $\phi A$, $\phi A'$, $\phi B$, and $\phi B'$ outputs of the translator control. The average form of the current signals for each phase for one full electrical cycle are shown in FIG. 2.

The motor shown in FIG. 1 is a simplified version of a two pole stepping motor. In other words, one full electrical cycle of current flow in the stator windings would produce one full mechanical revolution on the rotor. Stepping motors are usually constructed in multiple pole configurations where the outputs corresponding to each of the four phases ($\phi A$, $\phi A'$, $\phi B$ and $\phi B'$) are distributed to spaced windings around the circumference of the stator. In a standard stepping motor, this subdivision is done 50 times, producing a 50 pole machine. Thus, one full electrical cycle (see FIG. 2) would produce 1/50 of a mechanical revolution. For the remainder of this specification, all references to "stepping motor" will refer to a machine with a standard configuration of 50 poles.

By definition, a synchronous motor translator is a mechanism which converts input clock pulse signals (provided by an external controller) into multiple phase electrical output signals.

The stepping motor translator control unit 20 shown in FIG. 1 is capable of accepting up to five input signals. All five signals are interpreted as digital logic inputs. The most significant, CLOCK and DIRECTION, provide motor position control to the translator control circuitry. The CURRENT AMPLITUDE CONTROL signal has a less significant role in that it only provides the capability of changing the amplitude of the multiple phase output signals. As will be shown later, the amplitude of these signals is usually left constant during normal operation.

The CW LIMIT and CCW LIMIT signals provide the capability of inhibiting motor travel in a given direction (either CW or CCW). The function of these two input signals are relatively simple since their only purpose is to inhibit the input CLOCK pulse signals if the DIRECTION signal conflicts with a given limit signal.

The current output of each phase is not a perfectly smooth sinusoidal wave as shown in FIG. 2, but a stepped approximation thereof. It is desirable to be able to control the number of steps (micro-steps) per revolution of the stepping motor. A 50,000 micro-step per revolution resolution for a 50 pole stepping motor would require 1000 micro-steps per full electrical cycle (moving between two adjacent poles). A 200 step per revolution resolution for a 50 pole motor would require 4 micro-steps per full electrical cycle. The desired resolution differs for different applications. It is most desirable to be able to easily modify a translator controller to provide the desired resolution without major redesign. With this invention, it is possible to change the resolution to any one of 250 by simply replacing two integrated circuit chips: a programmable logic array and a programmable read only memory.

The translator controller 20 can be explained with reference to two sections: (1) a wave form generation section that converts the clock and direction input commands to separate stepped sine and cosine voltage signals having the desired resolution (micro-steps per full electrical cycle times 50) and (2) an output section that, in response to the stepped sine and cosine voltage signals, gates current to the four groups of windings (four phases). The output section uses an application of the technique known as pulse width modulated current control with a unique adaptation to provide a portion of the logic necessary to gate current to the correct phase.

Figure 3:
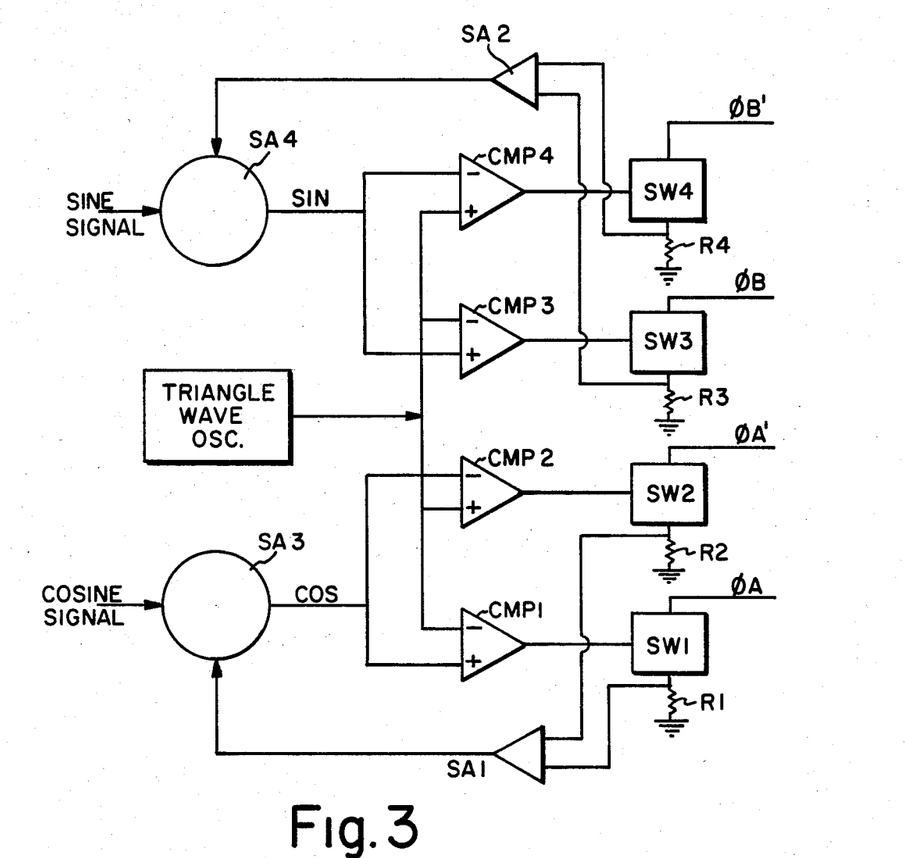
FIG. 3 is a schematic diagram of the output section of the translator controller according to this invention.

FIG. 3, in much simplified form, illustrates the circuitry of the output section of the translator controller 20. Four switches (SW1, SW2, SW3, and SW4) control current from the power supply through the windings to ground. The switches may be power FETs, for example, MOSFETs rated for 120 volts (closed) and 10 amperes. A suitable switch comprises Motorola MTP10N12. The switches have internal diodes to carry flyback current. Associated with each switch is a current sense resistor (R1, R2, R3, and R4). The voltage across each resistor is a current feedback signal indicative of the current through the switch and diode. The switches are considered in pairs that are never simultaneously conducting. One pair comprises SW1 and SW2 and the other pair comprises SW3 and SW4. Thus, the feedback signals from R1 and R2 are summed in summing amplifier SA1 and the feedback signals from R3 and R4 are summed in summing amplifier SA2. The feedback enables precise control of the current through the windings and the capability for shutdown on short circuit.

The combined current feedback signal from SA1 is summed with the stepped cosine signal in SA3 to provide an error signal COS. The combined current feedback signal SA2 is summed with the stepped sine signal in SA4 to provide an error signal SIN.

Each switch SW1, SW2, SW3 and SW4 is controlled by the output of a comparator CMP1, CMP2, CMP3, and CMP4 respectively. The output section includes a triangle wave oscillator having a frequency of, say, 35 kHz. The SIN and COS signals and the triangle wave signals are applied to the comparators as shown in the following table.

| COMPARATOR | INVERTING INPUT | NONINVERTING INPUT |
|---|---|---|
| CMP1 | Triangle wave | COS |
| CMP2 | COS | Triangle wave |
| CMP3 | Triangle wave | SIN |
| CMP4 | SIN | Triangle wave |

The comparators provide an output pulse when the noninverting input exceeds the inverting input. By adjusting the base level of the triangle wave, CMP1 will provide a PWM (pulse width modulated) output during the positive half cycle of the COS signal and CMP2 will provide a PWM output during the negative half cycle of the COS signal. Both the outputs of CMP1 and CMP2 are unipolar and are inverted or not to provide the correct polarity for activating the switches. The width of the pulses is directly proportional to a magnitude of the error signal COS. Likewise, CMP3 and CMP4 provide PWM outputs during opposite half cycles of the error signal SIN. The average values of the current pulses through the motor winding is thus as shown in FIG. 2. Averaging takes place by virtue of the inductance of the motor windings and the action of the flyback diodes.

Figure 4:
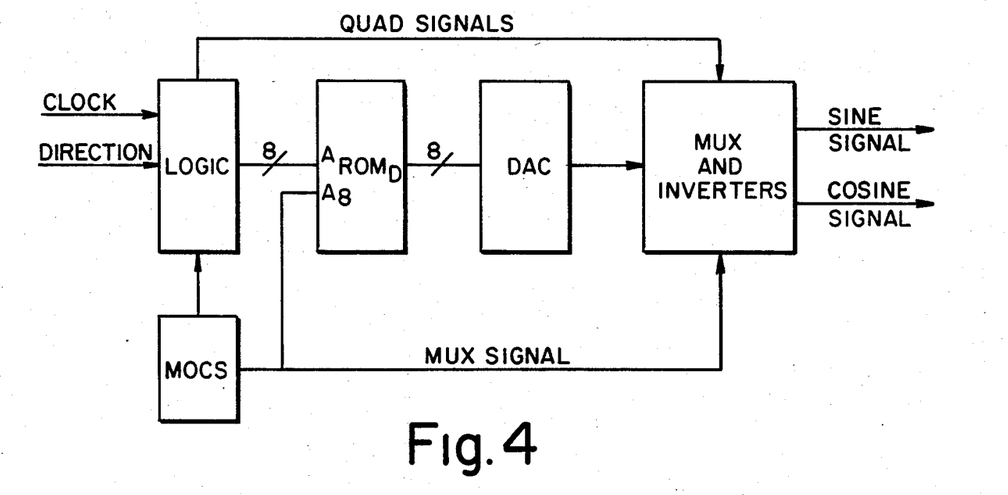
FIG. 4 is a schematic diagram of the wave form generating circuit of the translator controller according to this invention.

FIG. 4 schematically in much simplified form, illustrates the wave form generating section of the translator controller.

The sine table for the first quadrant and a cosine table for the first quadrant are stored in the read only memory ROM (M3). The address inputs A0 to A8 of the ROM have values of 0 to 511, the sine table being addressed by addresses 262 to 511 (when A8 is active) and the cosine table being addressed by addresses 6 to 255 (A8 is unactive). Thus the sine and cosine tables may have up to 250 data values stored therein corresponding to 250 micro-steps per quadrant.

The data values in the ROM are addressed by the LOGIC circuit which is basically an up/down counter with a binary output for activating inputs A0 to A7 of the ROM. A complete sine wave (all four quadrants) can be generated by use of both the sine and cosine table and by inversion. The data outputs of the ROM are applied to a digital-to-analog converter DAC. Thus, by use of the sine table during quadrant one, the cosine table during quadrant two, using the sine table in quadrant three and inverting the DAC output, and using the cosine table in quadrant four and inverting the DAC output the complete sine wave is generated. A similar sequence can be used to generate a cosine wave. It is of course arbitrary which quadrant is designated one (1) since the sine and cosine signals are identical but shifted one quadrant. The lagging signal is the sine signal.

Since a stepped sine wave and a stepped cosine wave must be simultaneously generated, a multiplexing oscillator MOSC and a multiplexing and inverting circuit are used. The oscillator signal is used to select either the cosine or sine table in ROM at A8. The multiplexer selects the output of the DAC and inverts the signals during the required quadrants. The outputs are pulsed stepped sine and cosine signals. The frequency of the multiplexing oscillator may be, say, 50 kHz. For a micro-stepping resolution of 200 micro-steps per full electrical cycle, the clock rate at 24 revolutions per minute of the motor is 4 kHz. In this case each step would be comprised of 12.5 pulses. These pulses are averaged by a smoothing filter on the input of the output section.

Figure 5A:
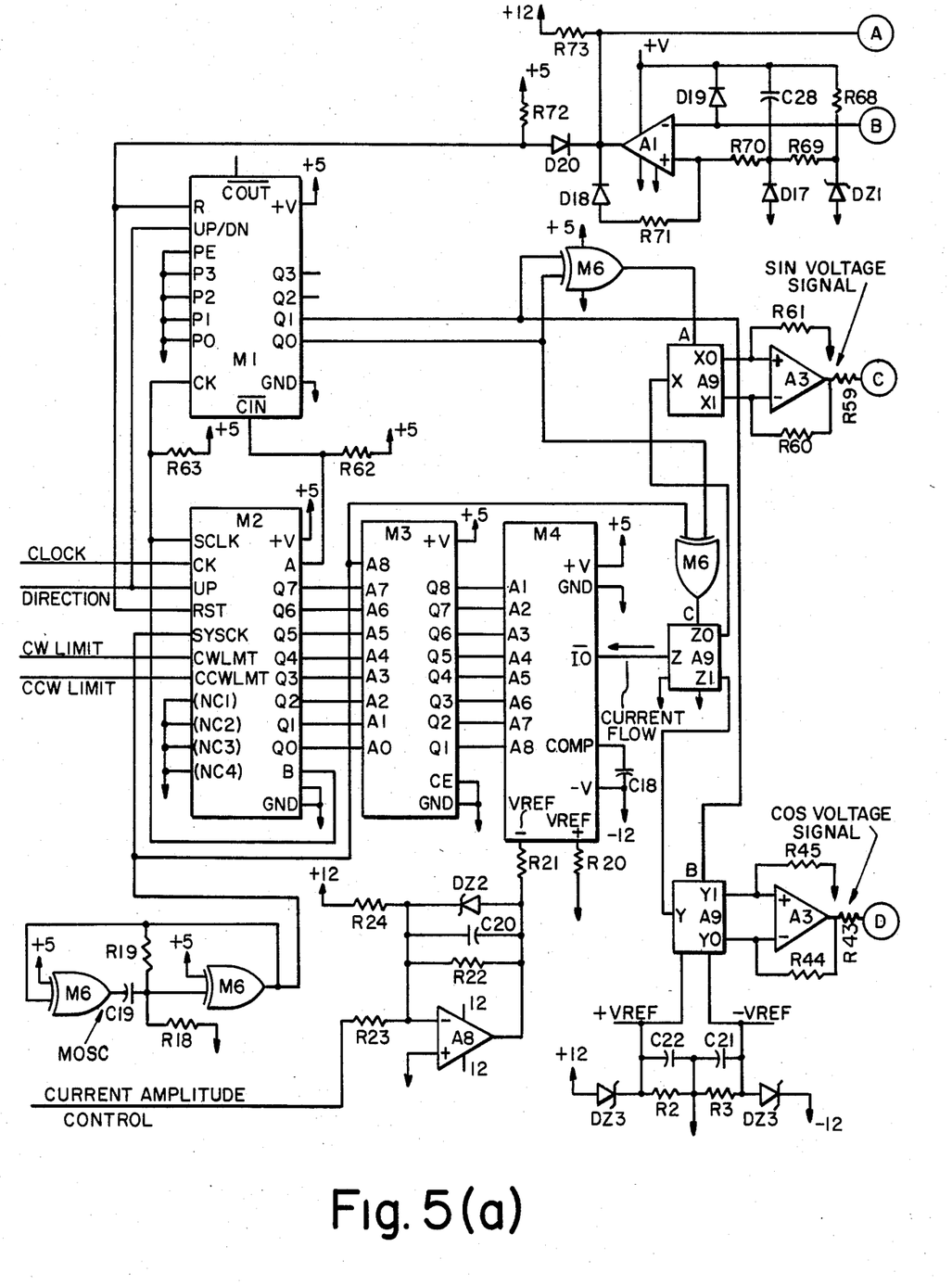
FIGS. 5(a) and 5(b) are detailed circuit diagrams.
Figure 5B:
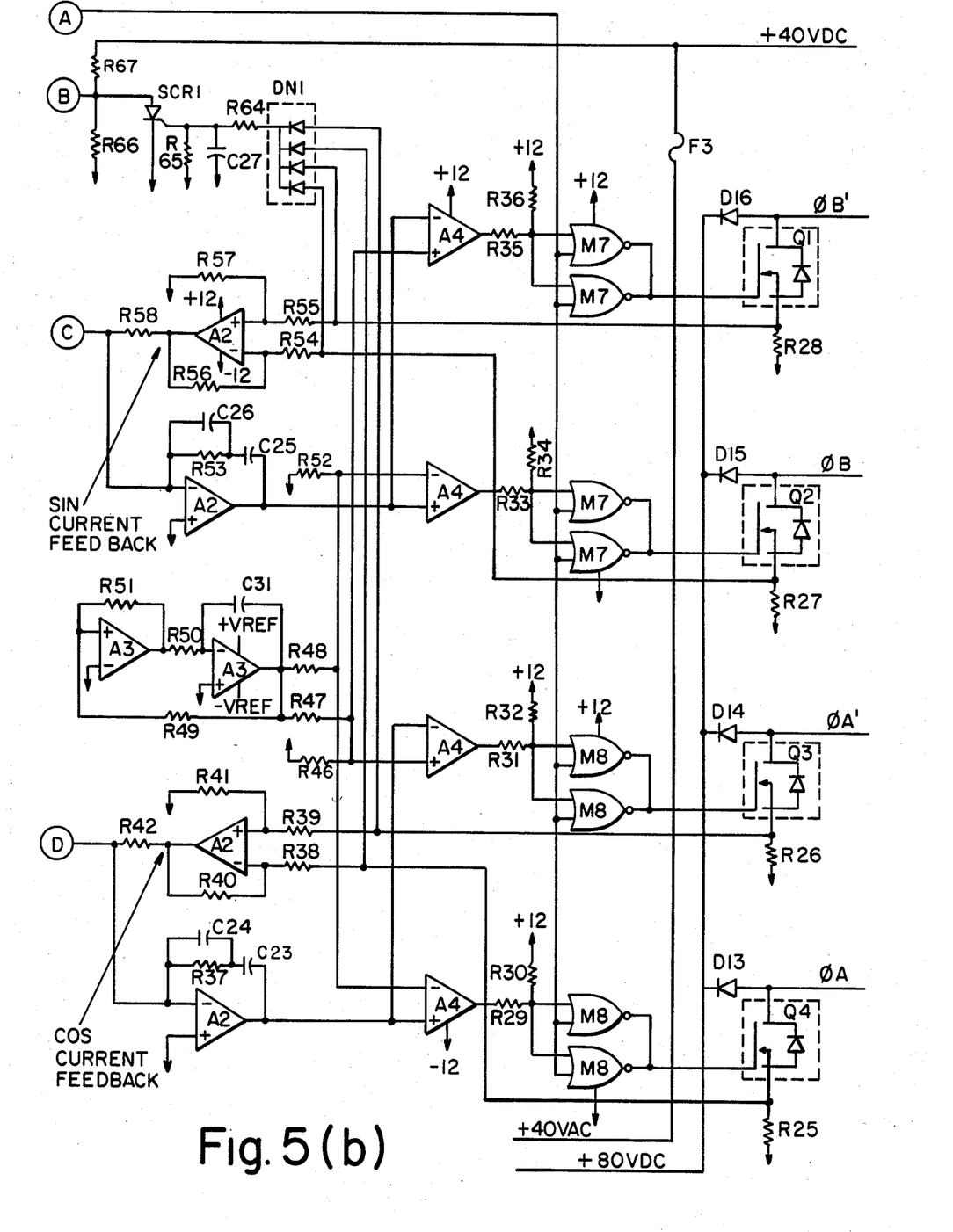

Referring now to FIGS. 5(a) and 5(b), which are detailed circuit diagrams of one embodiment of this invention, device M2 is a Programmable Logic Array (PAL). Basically, the job of M2 is to count up or count down (CW or CCW) the amount of input clock pulses provided by the CLOCK input signal. Counting up or counting down is determined by the logic state of the DIRECTION input signal.

The definition of the outputs Q0 to Q7, A and B are set forth in the following tables. Table I is for a 4000 step/revolution controller and Table II is for a 50,000 step/revolution controller. Table III includes the nomenclature for understanding Tables I and II.

TABLE I

```
/Q7 :=   /Q7*UP*/RST
     +   /Q7*A*/UP*/RST
    :+:  /Q6*/Q5*/Q4*/Q3*/Q2*/Q1*/Q0*A*/UP*/RST
     +   Q6*Q5*Q4*Q3*Q2*Q1*Q0*A*UP*/RST
/Q6 :=   /Q6*UP*/RST
     +   /Q6*A*/UP*/RST
    :+:  /Q5*/Q4*/Q3*/Q2*/Q1*/Q0*A*/UP*/RST
     +   Q5*Q4*Q3*Q2*Q1*Q0*A*UP*/RST
/Q5 :=   /Q5*UP*/RST
     +   /Q5*A*/UP*/RST
    :+:  /Q4*/Q3*/Q2*/Q1*/Q0*A*/UP*/RST
     +   Q4*Q3*Q2*Q1*Q0*A*UP*/RST
/Q4 :=   /Q4*UP*/RST
```

TABLE I-continued

```
     +   /Q4*A*/UP*/RST
    :+:  /Q3*/Q2*/Q1*/Q0*A*/UP*/RST
     +   Q3*Q2*Q1*Q0*UP*/RST
/Q3 :=   /Q3*UP*/RST
     +   /Q3*A*/UP*/RST
    :+:  /Q2*/Q1*/Q0*A*/UP*/RST
     +   Q2*Q1*Q0*A*UP*/RST
/Q2 :=   /Q2*UP*/RST
     +   /Q2*A*/UP*/RST
    :+:  /Q1*/Q0*A*/UP*/RST
     +   Q1*Q0*A*UP*/RST
/Q1 :=   /Q1*UP*/RST
     +   /Q1*A*/UP*/RST
    :+:  /Q0*A*/UP*/RST
     +   /Q0*UP*/RST
/Q0 :=   Q0*/RST
If (VCC) /B = RST*SYSCK
     +   /RST*/CK*/UP*/CCWLMT
     +   /RST*/CK*UP*/CWLMT
If (VCC) /A = Q7*Q6*Q5*/Q4*Q3*Q2*/Q1*/Q0*/UP
     +   Q7*Q6*Q5*Q4*Q3*Q2*Q1*Q0*UP
```

TABLE II

```
/Q7 :=   /Q7*UP*/RST
     +   /RST*/CK*UP*/CCWLMT
     +   /Q7*A*/UP*/RST
    :+:  /Q6*/Q5*/Q4*/Q3*/Q2*/Q1*/Q0*A*/UP*/RST
     +   Q6*Q5*Q4*Q3*Q2*Q1*Q0*UP*/RST
/Q6 :=   /Q6*UP*/RST
     +   /Q6*A*/UP*/RST
    :+:  /Q5*/Q4*/Q3*/Q2*/Q1*/Q0*A*/UP*/RST
     +   Q5*Q4*Q3*Q2*Q1*Q0*UP*/RST
/Q5 :=   /Q5*UP*/RST
     +   /Q5*A*/UP*/RST
    :+:  /Q4*/Q3*/Q2*/Q1*/Q0*A*/UP*/RST
     +   Q4*Q3*Q2*Q1*Q0*UP*/RST
/Q4 :=   /Q4*UP*/RST
     +   /Q4*A*/UP*/RST
    :+:  /Q3*/Q2*/Q1*/Q0*A*/UP*/RST
     +   Q3*Q2*Q1*Q0*UP*/RST
/Q3 :=   /Q3*UP*/RST
     +   /Q3*A*/UP*/RST
    :+:  /Q2*/Q1*/Q0*A*/UP*/RST
     +   Q2*Q1*Q0*UP*/RST
/Q2 :=   /Q2*UP*/RST
     +   /Q2*A*/UP*/RST
    :+:  /Q1*/Q0*A*/UP*/RST
     +   Q1*Q0*A*UP*/RST
/Q1 :=   /Q1*UP*/RST
     +   /Q1*A*/UP*/RST
    :+:  /Q0*A*/UP*/RST
     +   Q0*A*UP*/RST
/Q0 :=   Q0*/RST
If (VCC) /B = RST*SYSCK
     +   /RST*/CK*/UP*/CCWLMT
     +   /RST*/CK*UP*/CWLMT
If (VCC) /A = /Q7*/Q6*/Q5*/Q4*/Q3*Q2*Q1*/Q0*/UP
     +   Q7*Q6*Q5*Q4*Q3*Q2*Q1*Q0*UP
```

TABLE III

SYSTEM NOMENCLATURE

| / | Inverse of input or output logic definitions |
| := | Equality on leading edge of "SCLK" (positive true) |
| = | Equality (positive true) |
| :+: | Exclusive "OR" |
| * | "AND" |
| + | "OR" |

As it can be seen from Tables I, II, and III, many other resolutions (steps/revolution) can be chosen. Actually, as many as 250 resolutions can be programmed, starting at 200 steps/revolution to 50,000 steps/revolution. Changing the resolution involves basically the manipulation of the Boolean expression for/A and A. This expression is responsible for "skipping over" selected "count" numbers. The output connection of "A" on M2 is also responsible for controlling the quadrant counter M1.

The job of M1 is to select quadrants and assign polarities for the sine and cosine information stored in Read Only Memory (ROM) M3. ROM M3 is configured in 512×8 bits (9 bit address input denoted "N" and 8 bit parallel output denoted "M").

The cosine and sine respectively format for M3 when programmed for the 50,000 steps/revolution mode is as follows:

For N=6 to 255;

$$M=255 [SIN ((255-N)/249 \times 90°)]$$

For N=262 to 511;

$$M=255 [COS ((511-N)/249 \times 90°)]$$

For the 4000 step/revolution mode:
For N=236 to 255;

$$M=255 [SIN ((255-N)/19 \times 90°)]$$

For N=492 to 511;

$$M=255 [COS ((511-N)/19 \times 90°)]$$

For the above, N and M are "base 10" magnitudes converted to binary and loaded into M3.

All other N locations not represented by the equations listed above are loaded with zeros.

All fractional numbers of M are rounded to the nearest full digit.

A square wave oscillator MOSC assembled from components M6, R19, C19 and R18 is responsible for multiplexing sine and cosine information stored in M3. The signal produced by this oscillator is shown in FIG. 6(j).

Figures 6A, 6J:
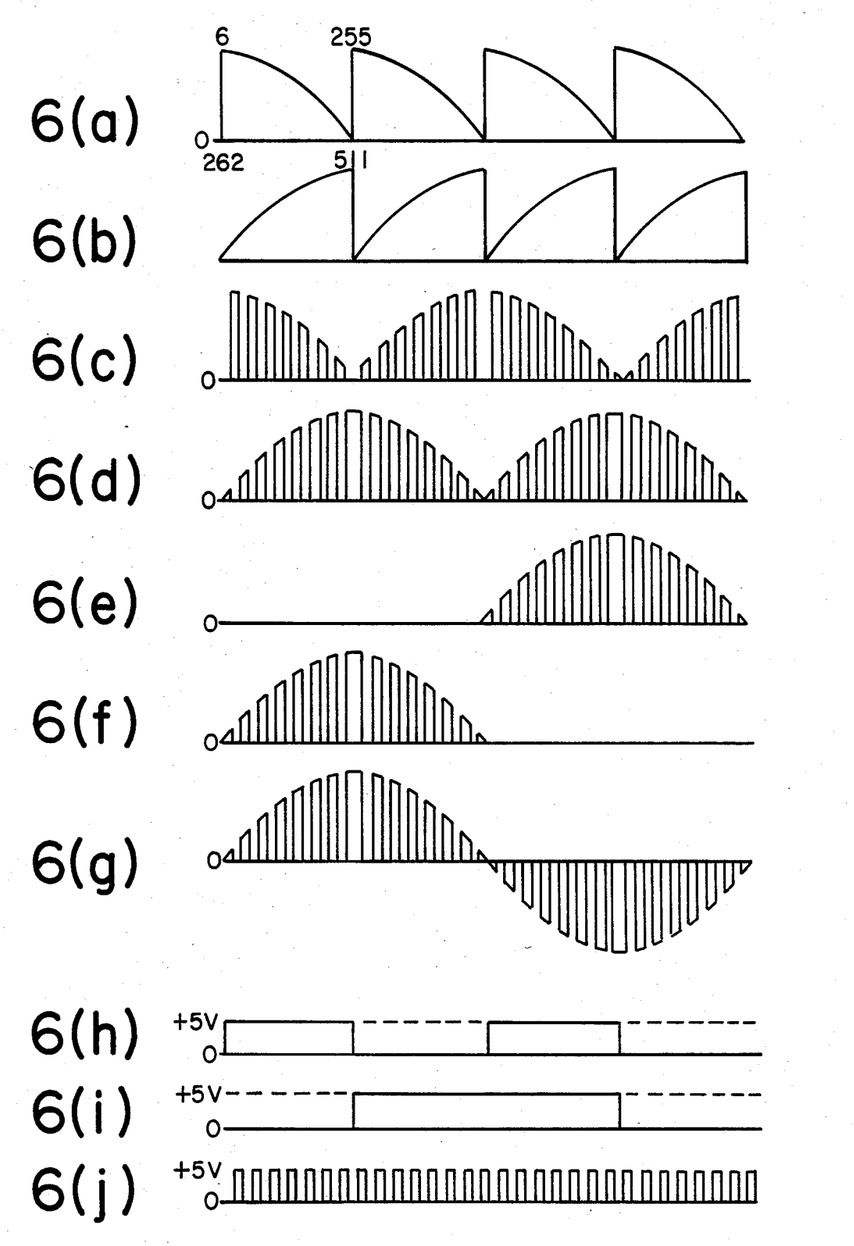

By appropriately programming into M3 sine and cosine information that is relative to the resolution set by device M2, a sine and cosine wave can be constructed through digital-to-analog converter M4, analog gates A9, and operation amplifiers A3 using quadrant information from M1 (shown in FIGS. 6(h) and 6(i)) and multiplexing information supplied by square wave signal (6j).

The formation of the sine and cosine waves (denoted SIN VOLTAGE SIGNAL and COS VOLTAGE SIGNAL in FIGS. 5(a) and 5(b)) is shown in the timing diagrams of FIGS. 6(a) to 6(j). In these Figures, a resolution of 50,000 steps/revolution is illustrated. Note, when referring to these diagrams, that the designation of the wave forms for SIN VOLTAGE and COS VOLTAGE is relative to the input direction selected by the DIRECTION signal of M2. For these examples, the "count up" (CW) direction was chosen.

FIG. 6(a) shows the current flow through $\overline{I0}$ of M4 (the analog signal) corresponding to addresses 6 to 256 of the ROM assuming no multiplexing. (Bit A8 of M3 is held at a constant low level.) The analog output is the first quadrant of a cosine wave. Likewise FIG. 6(b) shows the current flow through $\overline{I0}$ of M4 corresponding to addresses 262 to 511 assuming no multiplexing (bit A8 of M3 is held at a constant +5 V). The analog output is the first quadrant of a sine wave.

The frequency of the signals shown in FIGS. 6(a) and 6(b) depends upon the clock rate applied at CK of M2. In his example 250 pulses at CK of M2 are required for a complete quadrant and 1000 pulses for a complete electrical cycle.

In operation, the output of the PAL is multiplexed by application of a multiplex pulse (FIG. 6(j)) to A8 of M3. The current flow through Z1 of A9 is shown in FIG. 6(c) and the current flow through Z0 of A9 is shown in FIG. 6(d). The current flow through X0 of A9 is shown in FIG. 6(e). The current flow through X1 of A9 is shown in FIG. 6(f). The signals shown in FIGS. 6(c) and 6(d) are interleaved pulses. The pulses of FIG. 6(d) are converted to a full pulsed sine wave (FIG. 6(g)) by one-half of amplifier A3 which inverts the pulses in quadrants 3 and 4. In like form, the signal 6(c) is converted to a full cosine wave through A9 (Y1, Y0) and the other fourth of A3.

The SIN VOLTAGE SIGNAL (FIG. 6(g)) and COS VOLTAGE SIGNAL (not shown) represent current command signals. These signals, summed with their respective current feedback signals produced from one of four operational amplifiers on A2, and R27, R28, R54 through R58 (SIN CURRENT FEEDBACK) and an operational amplifier on A2, and R25, R26, R38 through R42 (COS CURRENT FEEDBACK) provide current flow control through PHASE B, B' and A, A', respectively.

The SIN VOLTAGE SIGNAL and the SIN CURRENT FEEDBACK SIGNAL are summed through current regulator circuit including an operational amplifier on A2, and C26, R53, C25. Similarly, the COS VOLTAGE SIGNAL and the COS CURRENT FEEDBACK are summed through current regulator circuit including an operational amplifier on A2, and C24, R37, C23. Both output signals from these regulators are then compared to the triangle wave generated by a circuit comprising two operational amplifiers on A3, and R49, R50, R51, C31. This comparison is accomplished by voltage comparators A4. The PWM Triangle Wave Generator operates at approximately 30 to 35 kHz. The output of comparators A4 control drivers M7 and M8, and ultimately MOSFETs Q1, Q2, Q3, and Q4.

A shutdown circuit consisting of voltage comparator A1 and associated components R71, D19, R70, D17, C28, R66 through R71, and DZ1 inhibits translator operation if the bus voltage (+40) falls below a preset level. An additional circuit arrangement consisting of components DN1, R64, R65, C27, SCR1 provides "latched" shutdown in the event of a short circuit condition on the windings of the stepping motor.

The amplitudes of the SIN VOLTAGE SIGNAL and COS VOLTAGE SIGNAL (and consequently, the amplitude of current flow through PHASES B, B' and A, A') can be changed concurrently, by adjusting the D.C. level of the CURRENT AMPLITUDE CONTROL input signal. Operational amplifier A8 and associated circuitry R23, R24, DZ2, C20, R21, and R22 provides buffering for this signal. A minimum current amplitude level can be set with biasing provided by R24. This minimum can then be increased by raising the bias on this input of R23 in the positive direction. The voltage signal on the output of A8 through R21 is fed to the analog reference input (−Vref) of the DAC M4. This reference voltage is multipled by the digital word fed to A1 through A8 of M4. This effectively controls the amplitudes (or gains) of the SIN VOLTAGE SIGNAL and COS VOLTAGE SIGNAL current command signals, concurrently. The purpose of CURRENT AMPLITUDE CONTROL is to allow the controller to reduce the current flow to the stepping motor in the standby mode. This effectively reduces motor heating. The signal applied to this input is usually kept constant when the translator is operating.

A listing of the components, other than resistors and capacitors, shown in FIG. 5 is set forth in Table IV.

TABLE IV

| COMPONENT | DESCRIPTION | PART NUMBER | MANUFACTURER |
|---|---|---|---|
| M1 | Up/Down Counter | MC14516B | Motorola |
| M2 | PAL | PAL20X8 | MMI |
| M3 | PROM | MCM7649 | Motorola |
| M4 | 8 Bit DAC | MC1408 | Motorola |
| M6 | Exclusive "OR" | MC74HC86 | Motorola |
| A9 | Analog Gate | MC14053B | Motorola |
| A3, A2 | Quad Op-Amp | MC4741 | Motorola |
| A4 | Quad Comparator | LM339 | National |
| M7, M8 | Quad "NOR" Gate | MC14001B | Motorola |
| A1 | Comparator | LM311 | Motorola |
| A8 | Op-Amp | MC1741 | Motorola |
| Q1 thru Q4 | Power MOSFET | MTP10N12 | Motorola |
| D13 thru D16 | Diode | IN4936 | Motorola |
| D17 thru D20 | Diode Array | DAN403 | Rohm |
| DN1 | Diode Array | DAN401 | Rohm |
| DZ1 thru DZ4 | Zener Diode | IN4736 | Motorola |

The translator control translates CLOCK and DIRECTION information into COS and SIN current command signals whose resolution is present by information stored in a PAL and PROM network. These current command signals are then summed with their associated current feedback signal through a PWM regulating technique, so as to produce accurately controlled SIN and COS current flow in the phase windings of the stepping motor. The alternating amplitudes of these currents, controlled by the CLOCK and DIRECTION inputs, produces a net rotating flux in the stator of the stepping motor. Dictated by the laws of magnetic coupling, the rotor of the stepping motor "follows" this accurately rotating flux. Thus, the rotor (or shaft) of the stepping motor can be accurately positioned by controlling the direction and number of clock pulses placed at the CLOCK and DIRECTION input connections.

The power supply intended for use with the translator controller is an unregulated 40 volt power supply and an 80 volt power supply that captures regenerative energy through diodes D13, D14, D15 and D16. The energy recaptured is then transferred back to the 40 volt power supply. The details of a suitable +40 volt and +80 volt power supply are disclosed in an application filed of even date herewith entitled "Power Supply" which is assigned to the same assignee.

I claim:

1. A micro-stepping translator controller for supplying current in at least two phases of a stepped periodic waveform to a stepping motor having a plurality of windings comprising a power supply for supplying current to all windings, electronic switches for gating current to all windings, an oscillator for outputting a multiplexing pulse train, logic means for receiving a clock pulse train input having a frequency being indicative of the micro-stepping rate and for receiving the multiplexing pulse train defining multiplexing intervals, said logic means having digital circuits for outputting over a data bus signals indicative of the function value for two one-quarter periods of a stepped periodic function, the period of said periodic function being divided into four one-quarter periods such that during the first one-quarter period the function value increases from zero to a positive maxim and during the second one-quarter period the function value decreases to zero, the value of the function changing stepwise with each clock input pulse, there being a fixed number of clock input pulses required for stepping through any one-quarter period, said signals on said data bus corresponding to different one-quarter periods of the stepped periodic function during different multiplexing intervals, said logic means having digital circuits for sequentially outputting a signal indicative of one of the four one-quarter periods, said signal changing value after the logic circuit has received clock pulses equal to the number of clock pulses required for stepping through one one-quarter period, a digital-to-analog converter connected to the output data bus for producing an analog signal, multiplexing and inverting means for selecting and during some multiplexing intervals inverting the output of the digital-to-analog converter in response to the multiplexing pulse train and said signal indicative of a one-quarter period, to produce at least two interleaved stepped periodic signals, an output circuit including said electronic switches for, in response to said at least two interleaved stepped periodic signals, gating said electronic switches on and off, each switch being gated on and off during one-half of the period of one of said interleaved stepped periodic signals.

2. A micro-stepping translator controller for supplying current in at least two phases of a stepped periodic waveform to a stepping motor, said stepping motor having a plurality of windings each assigned to one of a plurality of phase groups, said phase groups arranged in pairs that are never to be simultaneously energized, there being at least two pairs of phase groups, comprising a power supply for supplying current to all windings, electronic switches for gating current to all windings in each phase group, an oscillator for outputting a multiplexing pulse train defining multiplexing intervals, logic means for receiving a clock input having a frequency being indicative of the micro-stepping rate and for receiving the multiplexing pulse train, said logic means having digital circuits for outputting over a data bus signals indicative of two one-quarter periods of a stepped periodic function, the period of said periodic function being divided into four one-quarter periods such that during the first one-quarter period the function value increases from zero to a positive maxim and during the second one-quarter period the function value decreases to zero, the value of the function changing stepwise with each clock input pulse, there being a fixed number of clock input pulses required for stepping through any one-quarter period, said signals on said data bus corresponding to different one-quarter periods of the stepped periodic function during different multiplexing intervals, said logic means having digital circuits for sequentially outputting signals indicative of one of four one-quarter periods, said signal changing value after the logic circuit has received clock pulses equal to the number of clock pulses required for stepping through one one-quarter period, a digital-to-analog converter connected to the output data bus for producing an analog signal, multiplexing and inverting means for selecting and during some multiplexing intervals inverting the output of the digital-to-analog converter in response to the multiplexing pulse train and said signal indicative of a one-quarter period, to produce at least two interleaved stepped periodic signals, and an output circuit including said electronic switches and a plurality of comparator means which are arranged to control pairs of phase groups in response to one of said stepped periodic signals, said comparator means for gating the switches on and off, each switch being gated on and off during one-half of the period of one of said interleaved stepped periodic signals.

3. A micro-stepping translator controller for supplying current in at least two phases of a stepped periodic waveform to a stepping motor, said stepping motor having a plurality of windings assigned to a phase group, said phase groups arranged in pairs that are never simultaneously energized, said phase groups being energized by stepped periodic unidirectional current signals having the same frequency but being out of phase, there being at least two pairs of phase groups, comprising a power supply for supplying current to all windings, electronic switches for gating current to all windings in each phase group, each electronic switch having a control terminal, current sensors associated with each electronic switch for producing a signal indicative of the current through said switch, an oscillator for outputting a multiplexing pulse train defining multiplexing intervals, logic means for receiving a clock input having a frequency being indicative of the micro-stepping rate and for receiving the multiplexing pulse train, said logic means having digital circuits for outputting over a data bus signals indicative of two one-quarter periods of a stepped periodic function, the period of said periodic function being divided into four one-quarter periods such that during the first one-quarter period the function value increases from zero to a positive maxim and during the second one-quarter period the function value decreases to zero, the value of the function changing stepwise with each clock input pulse, there being a fixed number of clock input pulses required for stepping through any one-quarter period, said signals on said data bus corresponding to different one-quarter periods of the stepped periodic function during different multiplexing intervals, said logic means having digital circuits for sequentially outputting signals indicative of one of four one-quarter periods, said signal changing value after the logic circuit has received clock pulses equal to the number of clock pulses required for stepping through one one-quarter period, a digital-to-analog converter connected to the output data bus for producing an analog signal, multiplexing and inverting means for selecting and during some multiplexing intervals inverting the output of the digital-to-analog converter in response to the multiplexing pulse train and said signal indicative of one-quarter period, to produce at least two interleaved stepped periodic signals, an output circuit including said electronic switches for, in response to said stepped periodic signals, gating switches on and off during one-half of the period of one of said stepped interleaved periodic signals, said output circuit comprising a summing means associated with each signal phase and with one pair of switches for smoothing the multiplexed signal and combining with feedback signals from said current sensors associated with said associated switches to produce error signals for each pair of switches, a triangle wave oscillator, a plurality of comparators, one comparator of said plurality of comparators having an output connected to the control terminal of one of said switches, said comparators having inverting and noninverting inputs, means for connecting the outputs of each summing means to comparators associated with one pair of switches respectively and means for connecting the output of the triangle wave generator to all comparators, means for adjusting the D.C. level of the triangle wave oscillator before application to the comparators such that the switches are gated on and off during half periods of one said stepped periodic signals.

4. A micro-stepping translator controller according to claim 1, 2, or 3 further comprising gates between each comparator and each associated switch, a shutdown circuit that latches if the current in any switch exceeds a threshold indicative of a short circuit and generates a shutdown signal applying said shutdown signal to the gates to prevent the switches from conducting.

5. A micro-stepping translator controller according to claim 1, 2, or 3 further comprising means for adjusting the amplitude of the output of the analog-to-digital converter.

* * * * *